United States Patent [19]
LeMay

[11] 3,939,858
[45] Feb. 24, 1976

[54] ASSEMBLY AND METHOD OF OBTAINING A CONTROLLED GAS MIXTURE

[75] Inventor: Dan B. LeMay, Palos Verdes Estates, Calif.

[73] Assignee: Tylan Corporation, Torrance, Calif.

[22] Filed: Sept. 13, 1974

[21] Appl. No.: 505,893

[52] U.S. Cl. ................................. 137/90; 48/195
[51] Int. Cl.² ................................. G05D 11/13
[58] Field of Search ........... 137/90; 239/34; 338/20; 55/386; 23/254 E, 255 E; 48/195

[56] References Cited
UNITED STATES PATENTS

| | | | |
|---|---|---|---|
| 1,767,588 | 6/1930 | Hutton | 137/90 |
| 2,349,521 | 5/1944 | Schmidt | 137/90 |
| 2,352,584 | 6/1944 | Ziebolz et al. | 137/90 |
| 3,205,465 | 9/1965 | Lambertson et al. | 338/20 |
| 3,412,935 | 11/1968 | O'Keeffe | 239/34 |
| 3,634,053 | 1/1972 | Klass et al. | 48/195 |

*Primary Examiner*—William R. Cline
*Assistant Examiner*—H. Jay Spiegel
*Attorney, Agent, or Firm*—Nilsson, Robbins, Bissell, Dalgarn & Berliner

[57] ABSTRACT

Apparatus and method for obtaining a controlled gas mixture of predetermined proportionality using a temperature dependent permeation tube or like source for the addition of a small amount of a constituent gas in a higher flow rate carrier gas. A thermistor having a negative coefficient of resistance is associated with the permeation source and electrically connected to a flow controller for the carrier gas to automatically regulate the flow rate of the carrier gas in accordance with temperature variation of the permeation source.

8 Claims, 1 Drawing Figure

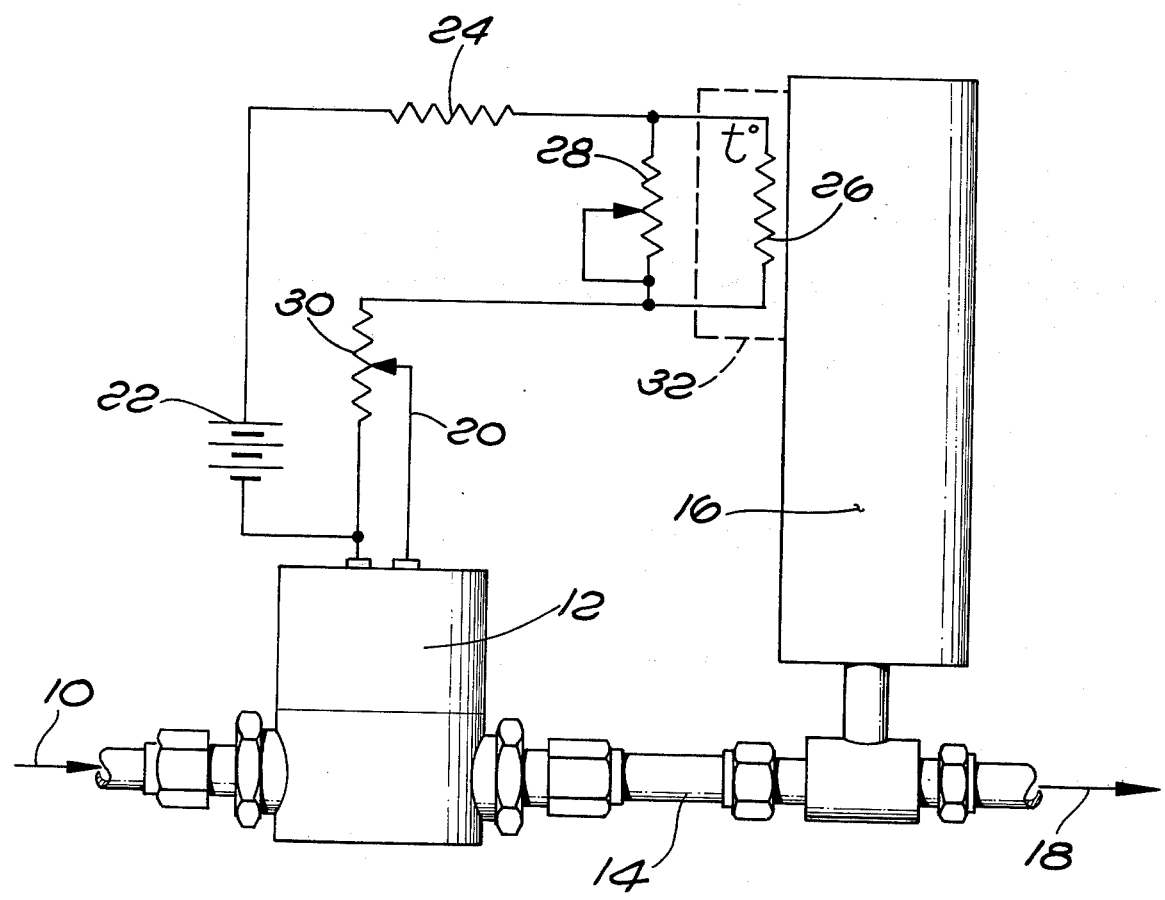

ASSEMBLY AND METHOD OF OBTAINING A CONTROLLED GAS MIXTURE

FIELD OF THE INVENTION

The fields of art to which the invention pertains include the fields of fluid handling and proportionating systems.

BACKGROUND AND SUMMARY OF THE INVENTION

In the pollution monitoring industry it is often necessary to create blends of certain pollutants in carrier gases in known quantities for use as calibration mixtures for calibrating pollution monitors. Similarly, in the semiconductor industry it is often necessary to create blends of dopants at very dilute ratios in carrier gases for the doping of semiconductors in reactors. These very dilute blends, in parts per million or fractions of a part per million, are not sufficiently stable to be stored in compressed gas cylinders as pre-mixed blends; therefore, they must be created dynamically at the time of use. In one conventional method, a high ratio blend of the material is stored in a cylinder with a carrier gas. At the time of use this relatively concentrated blend is diluted with a much larger flow rate of carrier gas, using conventional means for measuring and controlling the flow rates of both the mixed gas and the added diluent. In another conventional method, a permeation tube or like source is used to store a small amount of the pure material. The permeation source emits this material at a consistent flow rate at a given temperature. The permeation source is contained in an oven to control the temperature, and the emission rate (typically a few hundred nanograms per minute) is measured by successive weighings. A carrier gas of known flow rate is passed over the permeation source, thereby delivering a known blend in the sub-ppm range. See, in this regard, O'Keeffe U.S. Pat. No. 3,412,935.

The first method described above is somewhat cumbersome because of the large storage cylinders, and the need to control two flow rates to give the required dilution ratio. A further problem for precision work is the unreliability of the mixture stored in the pressure cylinder. The second method described above works well except for a requirement for very precise temperature control. The typical O'Keeffe permeation source is a tube having an emission rate which varies approximately 10 to 15 percent per degree centigrade. This permeation source must therefore be maintained in an oven with an extremely precise temperature control and requires from 5 to 24 hours for stabilization after the oven is activated following a period of storage or transportation without oven control. In a newer version of a permeation source, devised by R. Chand, temperature dependence is reduced to about four percent per degree centigrade for liquid-phase devices and to about 1.0 percent per degree centigrade for gas-phase devices. Such improved devices, therefore, are less subject to temperature variations, but they still require at least modest temperature control when utilized in precision applications.

The present invention utilizes a permeation source, but overcomes the foregoing drawbacks by controlling the rate of delivery of the carrier gas without exercising control over the rate of emission from the permeation source. Carrier gas flow is automatically regulated by an electronic mass flow controller in accordance with temperature variations of the permeation source to compensate for temperature dependent changes and emission from the permeation source, thereby maintaining the desired proportionality of the blend. Accordingly, no temperature-controlled oven is needed and fixed, known, dilute gaseous blends are delivered upon command.

In a specific embodiment, automatic regulation of the mass flow controller is obtained by an electrical signal circuit including a thermistor closely associated with the permeation source. The thermistor has a negative temperature coefficient of resistance which is adjustable by a voltage divider to compensate for the positive temperature coefficient of emission of the permeation source.

Prior art, additional to the foregoing, includes U.S. Pat. Nos. 1,719,898 and 3,702,619.

BRIEF DESCRIPTION OF THE DRAWING

The FIGURE is a generally diagrammatic showing of an electronic mass flow controller, a permeation source and electrical circuit therefor in accordance with the present invention.

DETAILED DESCRIPTION

As required, details of an illustrative embodiment of the invention are disclosed. However, it is to be understood that these details merely exemplify the invention which may take forms different from the specific illustrative embodiment disclosed. Therefore, specific structural and functional details are not necessarily to be interpreted as limiting, but as a basis for the claims.

Referring to the FIGURE, a source 10 supplies carrier gas, e.g. purified air, to an electronic mass flow controller 12 which delivers the carrier gas at a precise predetermined flow rate to a conduit 14. Within the conduit 14, the stream of air passes over a permeation source 16 containing permeand (gas to be diluted), during which process the carrier gas is impregnated with gaseous permeand escaping from the permeation tube 16 to form a blend 18 of permeand and carrier gas of desired proportionality. The gaseous blend 18 is then available for use, for example, in calibrating air monitoring instruments.

In accordance with the present invention, the mass flow controller 12 is regulated by an electrical circuit 20 which includes as components a source 22 of D.C. current, one or more circuit resistors 24, a thermistor 26, a potentiometer 28 in parallel with the thermistor 26, and a voltage divider (command signal) potentiometer 30 for adjusting the flow rate of the flow controller 12. The thermistor 26 has a negative coefficient of resistance and is closely physically associated with the permeation source assembly 16, e.g. by being taped to the permeation source 16, as indicated schematically at 32.

The permeation source 16 and the thermistor 26 both respond to changes in ambient temperature. With increases in temperature, the permeation source 16 emits an increased amount of permeand and the thermistor 26 decreases in resistance, and vice-versa. Accordingly, as the temperature increases, current flow to the command signal potentiometer 30 increases, the command voltage to the mass flow controller 12 will increase, correspondingly increasing its flow rate to deliver an increased level of carrier gas to the permeator tube 16 which, with appropriate resistance values, serves to compensate for the increased flow of permeand, thereby maintaining the desired proportionality of the blend.

The potentiometer 28 is placed in parallel with the thermistor 26 so as to permit adjustment of the temperature coefficient of resistance of the thermistor-potentiometer combination to match that of the permeator source 16. Of course, one would choose a thermistor 26 having a negative temperature coefficient of resistance, which is close in magnitude to the positive temperature coefficient of emission of the permeation tube 16. If an exact match can be made, the potentiometer 28 can be omitted; however, it remains useful as a means of adjustment.

Initial setting of the mass flow controller 12 is obtained by means of the voltage divider potentiometer 30 as necessary to deliver carrier gas at the desired rate. Thereafter, the thermistor 26 automatically regulates the mass flow controller 12. Different settings of potentiometer 30 serve to command corresponding different settings of the output concentration at 18.

Electronic mass flow controllers are well known commercial instruments as are permeation sources. For the mass flow controller 12, one can conveniently use a flow controller sold by Tylan Corporation, Torrance, California, under the trade designation FC-200. Such a controller will maintain a preset mass flow to within ±0.25 percent of setting at an operating pressure of 5–40 psid at 5°–43°C.

Permeation sources consist of fluorinated ethylene-propylene copolymer tubing or other permeable substances usually containing a liquefied substance in equilibrium with its gaseous phase. The permeation source is preferably one having a temperature coefficient of emission of less than 5 percent per degree C, such as the Chand-type devices referred to above, as temperature compensation therefor is most readily achieved by the foregoing circuit. Such devices are obtainable from Ecology Board, Inc., Chatsworth, California, and are available for a wide variety of permeands including $SO_2$, $NO_2$, $H_2S$, $H_2O$ and many hydrocarbons, and can be used for other materials. Chand permeation sources exhibit a temperature coefficient of emission of about 4 percent per degree C for liquid phase devices and as low as 0.5 percent per degree C for gas phase devices.

One can use any commercial thermistor, for example, one can use a Gulton Type D thermistor having a resistance of 3,000 ohms at 30°C and a negative coefficient resistance of 4.4 percent per degree C. In place of a thermistor 26, one could use any other suitable temperature-compensation device such as a resistance thermometer bridge and amplifier, as known, or the like. One could use a thermistor with a positive coefficient of resistance with appropriate circuit logic, as known.

The other components of the circuit are chosen as required for appropriate operation of the mass flow controller 12 and thermistor 26. With the Tylan FC-200 Flow Controller, Gulton Type D thermistor and Chand gas-phase permeation tube referred to above, one can use a power supply 22 of 15 volts D.C., a resistance 24 of 6,980 ohms and voltage divider potentiometers 28 and 30 of 5,000 ohms each.

I claim:

1. Apparatus for obtaining a controlled mixture of a first gas and a carrier gas, comprising:
    a mass flow controller for delivering carrier gas at a controlled rate of flow;
    a source of said first gas which emits said gas at a mass flow rate which is a repeatable function of the ambient temperature of said source;
    means for adding said first gas into carrier gas delivered by said mass flow controller for dilution in predetermined proportionality with said carrier gas; and
    means for automatically changing the flow rate of said mass flow controller in accordance with variations in said ambient temperature of said source to compensate for temperature-dependent changes in the emission rate therefrom whereby to substantially maintain their proportionality.

2. The apparatus of claim 1 in which said source of said first gas comprises a permeation source.

3. The apparatus of claim 1 in which said flow controller is a gas mass flow controller.

4. The apparatus of claim 1 wherein said flow controller is responsive to an electrical signal for delivery of said carrier gas proportional therewith and wherein said rate-changing means includes means for generating said electrical signal proportional to said temperature variation.

5. The apparatus of claim 4 wherein said source of said first gas has a positive temperature coefficient of emission and said signal-generating means includes an electrical circuit component having a negative temperature coefficient of resistance.

6. The apparatus of claim 5 wherein said signal-generating means includes means for adjusting the temperature coefficient of resistance of said circuit.

7. The apparatus of claim 5 wherein said circuit component comprises a thermistor.

8. Apparatus for obtaining a controlled mixture of first gas and carrier gas, comprising:
    a mass flow controller for delivering carrier gas at a controlled rate of flow proportionally responsive to a voltage applied thereacross;
    a permeation source containing said first gas for emitting said first gas at a mass flow rate which is a repeatable function of the ambient temperature of said source and which is lower than said controlled rate, into carrier gas delivered by said mass flow controller for dilution in a predetermined proportionality with said carrier gas, said permeation source having a significant positive temperature coefficient of emission; and
    an electrical circuit including, as components thereof, a source of said voltage for said mass flow controller, a thermistor, closely and physically associated with said permation source, having a negative temperature coefficient of resistance, and a voltage-dividing means for adjusting the temperature coefficient resistance of said circuit for substantially maintaining said proportionality.

* * * * *